(12) United States Patent
Camp

(10) Patent No.: US 10,919,446 B1
(45) Date of Patent: Feb. 16, 2021

(54) INTEGRATED SIDEWALL LIGHT

(71) Applicant: The Boeing Company, Chicago, IL (US)

(72) Inventor: Randy C. Camp, Kirkland, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 16/556,463

(22) Filed: Aug. 30, 2019

(51) Int. Cl.
| | | |
|---|---|---|
| *B60Q 3/00* | (2017.01) | |
| *B64G 1/60* | (2006.01) | |
| *B64D 11/00* | (2006.01) | |
| *B64D 47/02* | (2006.01) | |
| *B60Q 3/208* | (2017.01) | |
| *B60Q 3/267* | (2017.01) | |
| *B60Q 3/50* | (2017.01) | |
| *F21S 8/02* | (2006.01) | |
| *B60Q 3/62* | (2017.01) | |
| *B60Q 3/64* | (2017.01) | |
| *B60Q 3/43* | (2017.01) | |
| *B60Q 3/54* | (2017.01) | |
| *B60Q 3/217* | (2017.01) | |
| *B60Q 3/66* | (2017.01) | |
| *B60Q 3/41* | (2017.01) | |
| *B60Q 3/51* | (2017.01) | |

(52) U.S. Cl.
CPC ............... *B60Q 3/00* (2013.01); *B64D 11/00* (2013.01); *B64D 47/02* (2013.01); *B64G 1/60* (2013.01); *B60Q 3/208* (2017.02); *B60Q 3/217* (2017.02); *B60Q 3/267* (2017.02); *B60Q 3/41* (2017.02); *B60Q 3/43* (2017.02); *B60Q 3/50* (2017.02); *B60Q 3/51* (2017.02); *B60Q 3/54* (2017.02); *B60Q 3/62* (2017.02); *B60Q 3/64* (2017.02); *B60Q 3/66* (2017.02); *B64D 2011/0038* (2013.01); *B64D 2203/00* (2013.01); *F21S 8/02* (2013.01); *F21S 8/024* (2013.01); *F21S 8/026* (2013.01)

(58) Field of Classification Search
CPC ... B60Q 3/12; B60Q 3/51; B60Q 3/62; B60Q 3/64; B60Q 3/66; B60Q 3/82; B60Q 3/208; B60Q 3/217; B60Q 3/267; B60Q 3/43; B60Q 3/53; B60Q 3/54; B60Q 3/56; B64D 2011/0038; F21S 8/024; F21S 8/02; F21S 8/26
See application file for complete search history.

(56) References Cited

U.S. PATENT DOCUMENTS

| | | | | |
|---|---|---|---|---|
| 2008/0012728 A1* | 1/2008 | Heym | ............... | B64D 11/0015 340/945 |
| 2008/0210953 A1* | 9/2008 | Ladstatter | ............... | F21S 8/026 257/88 |
| 2010/0002443 A1* | 1/2010 | Schultheis | ............... | B60Q 3/56 362/282 |

(Continued)

FOREIGN PATENT DOCUMENTS

| | | | | |
|---|---|---|---|---|
| FR | 3058776 A1 * | 5/2018 | ........... | G02B 6/0001 |
| WO | WO-2006015588 A1 * | 2/2006 | ............. | B60R 13/02 |

*Primary Examiner* — Alexander K Garlen
*Assistant Examiner* — Colin J Cattanach
(74) *Attorney, Agent, or Firm* — Coats & Bennett, PLLC

(57) ABSTRACT

Methods, systems, and apparatuses are disclosed for conditioning or blending light for increasing the uniformity of light distribution and light wavelength customization, and light arrays integrated into structural and non-structural assemblies and sub-assemblies in cabin interiors.

23 Claims, 9 Drawing Sheets

(56) References Cited

U.S. PATENT DOCUMENTS

| | | | | |
|---|---|---|---|---|
| 2012/0224382 A1* | 9/2012 | Petersohn | ................ | B60Q 3/64 |
| | | | | 362/471 |
| 2014/0003040 A1* | 1/2014 | Holman | ............... | G02B 6/0046 |
| | | | | 362/147 |
| 2015/0166178 A1* | 6/2015 | Savian | ................. | B64D 11/003 |
| | | | | 244/118.6 |
| 2016/0091173 A1* | 3/2016 | Camp, III | ................ | B60Q 3/43 |
| | | | | 362/242 |
| 2016/0214529 A1* | 7/2016 | Valentine, Jr. | ........... | B60Q 3/47 |
| 2016/0238215 A1* | 8/2016 | Ohta | ..................... | B64D 11/00 |
| 2017/0368990 A1* | 12/2017 | Blacken | ................... | B60Q 3/20 |
| 2018/0224096 A1* | 8/2018 | Petzold | ................... | F21V 21/04 |
| 2020/0043307 A1* | 2/2020 | Lapujade | ............... | B64D 45/00 |

* cited by examiner

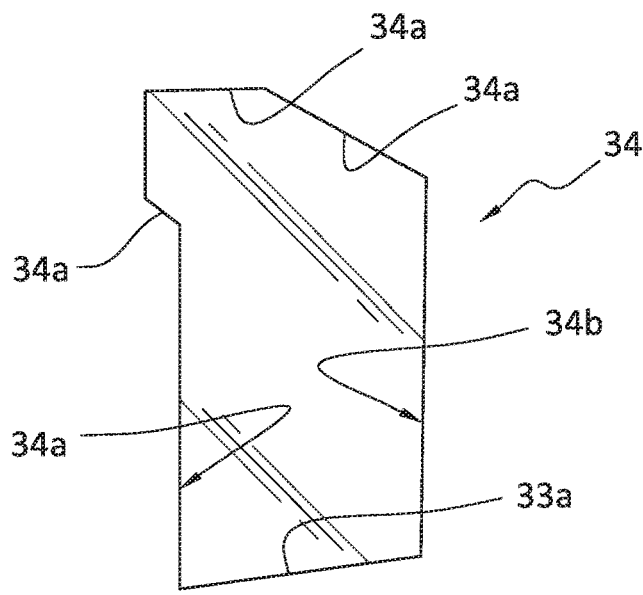
FIG. 6
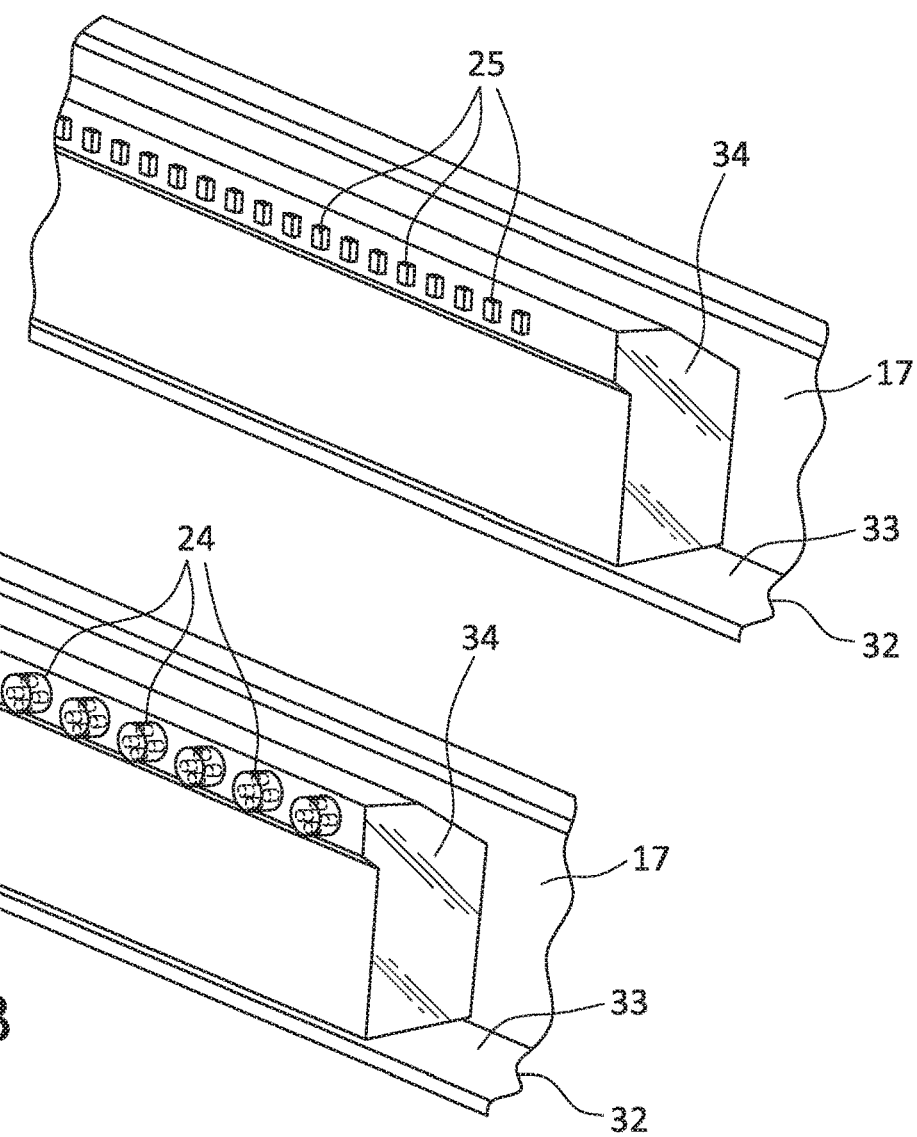
FIG. 7A
FIG. 7B

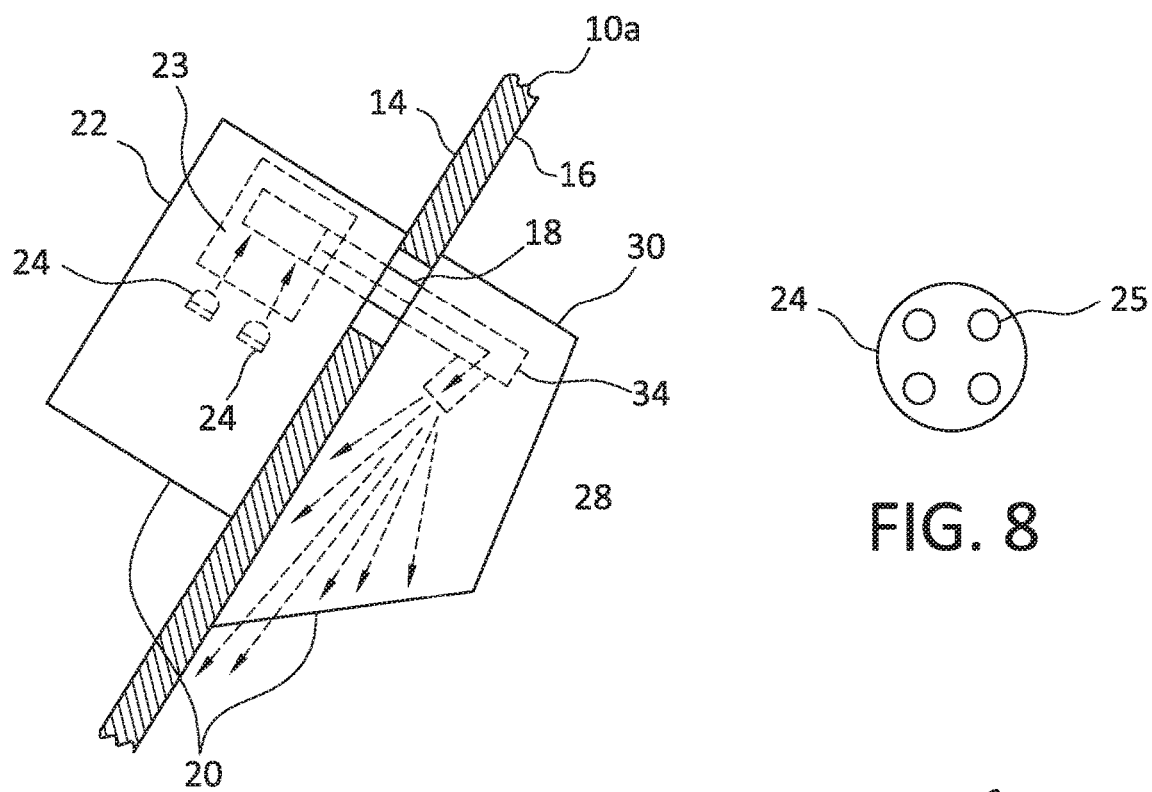
FIG. 8
FIG. 9
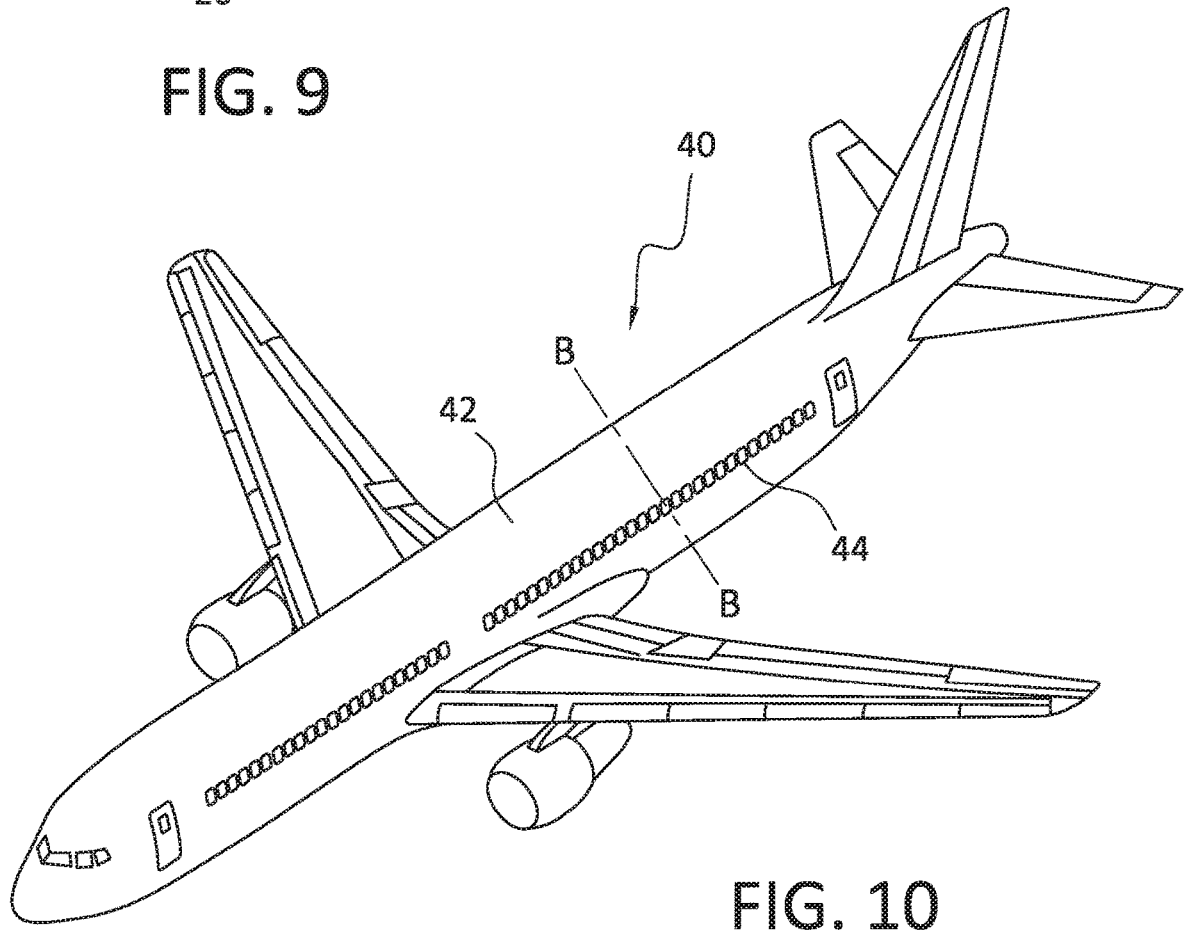
FIG. 10

INTEGRATED SIDEWALL LIGHT

TECHNOLOGICAL FIELD

The present disclosure relates generally to the field of integrated lighting systems. More specifically the present disclosure relates to the methods, systems, and apparatuses for conditioning integrated lighting and conditioning integrated light system outputs and effects.

BACKGROUND

Interior lighting, including ambient lighting is typically produced for decorative and functional effect. In cabin interiors, including vehicle cabin interiors, including, for example, aircraft cabin interiors, etc., interior cabin space comes at a premium. Lighting arrays that provide lighting along walls are often required in combination with lighting from other lighting sources positioned or otherwise oriented in structures including, for example, ceilings etc., to produce the light required to adequately illuminate the enclosed cabin.

When lighting emanates from multiple lighting sources, a relative lighting uniformity is difficult to achieve. For example, lighting provided in largely linear orientation, especially non-white, or colored lighting, is typically difficult to blend to the point of creating a predetermined uniformity over a surface. A lack of lighting uniformity, for example, can produce a series of more brightly lit and more dimly lit areas on a surface, producing so-called perceptible "scalloping effects". Such scalloping effects typically appear as regularly or irregularly more dimly lit areas (e.g., areas appearing as shadows, etc.) intermingled with the more brightly lit areas. Producing predetermined and desired lighting uniformity, particularly in confined spaces including cabin interiors, remains a challenge.

SUMMARY

According to a present aspect, a panel assembly that can be a window assembly (e.g., a sidewall assembly comprising a window, etc.) is disclosed including a panel having a panel thickness, with the panel including a panel first side and a panel second side, a through opening through the thickness of the panel, with the through opening extending from the panel first side to the panel second side, a light array, with the light array configured to be incorporated into the panel. The light array includes a first enclosure configured to enclose the light array, said first enclosure oriented on the panel first side, with the first enclosure including at least one light source cluster, and with the light source cluster in communication with an electrical source. The light array further includes a light conditioning optical array configured to blend light emitted from the light source cluster, with the light conditioning optical array in communication with the light source cluster. The light array further includes a second enclosure oriented on the panel second side, with the second enclosure including a directional optical array configured to receive emitted light from the light conditioning array and direct or re-direct light received from the light conditioning array out from the second enclosure.

In another aspect, at least the first enclosure or the second enclosure houses a light emitting diode cluster.

In a further aspect, the light conditioning optical array comprises at least one light guide.

In another aspect, the light source cluster comprising a plurality of individual light sources, said individual light sources emitting different wavelengths of visible light.

In a further aspect, the panel comprises at least one of: a window panel; a ceiling panel; a sidewall panel; a floor panel; a seat panel; or combinations thereof.

In another aspect, the panel assembly includes at least one of a window panel assembly; a ceiling panel assembly; a sidewall panel assembly; a floor panel assembly; a seat panel assembly; or combinations thereof In another aspect, a vehicle includes at least one of the disclosed panels or panel assemblies.

In a further aspect, the vehicle including at least one of the disclosed panels or panel assemblies includes at least one of an aircraft; a spacecraft; a rotorcraft; a terrestrial vehicle; a surface water borne vehicle; a sub-surface waterborne vehicle, and combinations thereof.

According to another present aspect, a cabin interior that includes cabin interior assemblies is disclosed with the cabin interior including a panel having a panel thickness, with the panel including a panel first side and a panel second side, and a through opening through the thickness of the panel, with the through opening extending from said panel first side to said panel second side and a light array, with the light array configured to be incorporated into the panel. The light array includes a first enclosure configured to enclose elements of the light array, said first enclosure oriented on the panel first side, with the first enclosure including at least one light cluster, with the light cluster in communication with an electrical source, and in communication with a light conditioning optical array that is configured to blend light emitted from the light cluster. The light array further includes a second enclosure oriented on the panel second side, with the second enclosure including a directional optical array configured to receive emitted light from the light conditioning array and further configured to direct or re-direct light received from the light conditioning array out from the second enclosure.

In another aspect, the panel comprises at least one of: a ceiling panel; a sidewall panel; a floor panel; a seat panel; or combinations thereof.

According to another aspect, a method for illuminating an environment is disclosed, with the method including activating a lighting source, said lighting source configured to be integrated into a panel assembly, with the panel assembly comprising a panel having a panel thickness, with the panel including a panel first side and a panel second side, and a through opening through the thickness of the panel extending from said panel first side to said panel second side, a light array, with the light array configured to be incorporated into the panel, and with the light array including a first enclosure oriented on the panel first side. The first enclosure includes at least one light source cluster positioned in a first enclosure, with the light source cluster including a plurality of individual light sources, with the individual light sources emitting different wavelengths of visible light, and with the light source cluster in communication with an electrical source. The light array further includes a light conditioning optical array configured to blend light emitted from the light source cluster, with the light conditioning optical array in communication with the light source cluster, and a second enclosure oriented on the panel second side, with the second enclosure including a directional optical array configured to receive emitted light from the light conditioning array and re-direct emitted light received from the light conditioning array out of the second enclosure and into an environment. The method further includes emitting light from the light source cluster, selectively blending the individual light sources in the light conditioning optical array to obtain a predetermined and desired blended wavelength of visible light, and directing the blended wavelength of visible light from the panel assembly, and wherein the panel assembly comprises at least one of: a ceiling panel; a window panel; a floor panel; a seat panel; or combinations thereof.

In another aspect, the aforementioned method further includes, in the step of selectively blending the individual light sources, the method further includes sending a signal from an input to a controller, with the controller configured to be in communication with the light conditioning array to the light conditioning, and sending a signal from the controller to the light conditioning array.

In another aspects, the method further includes activating one or more of the plurality of lighting sources and controlling the illumination of the plurality of lighting sources.

The features, functions and advantages that have been discussed can be achieved independently in various aspects or may be combined in yet other aspects, further details of which can be seen with reference to the following description and the drawings.

BRIEF DESCRIPTION OF THE DRAWINGS

Figure 1A:
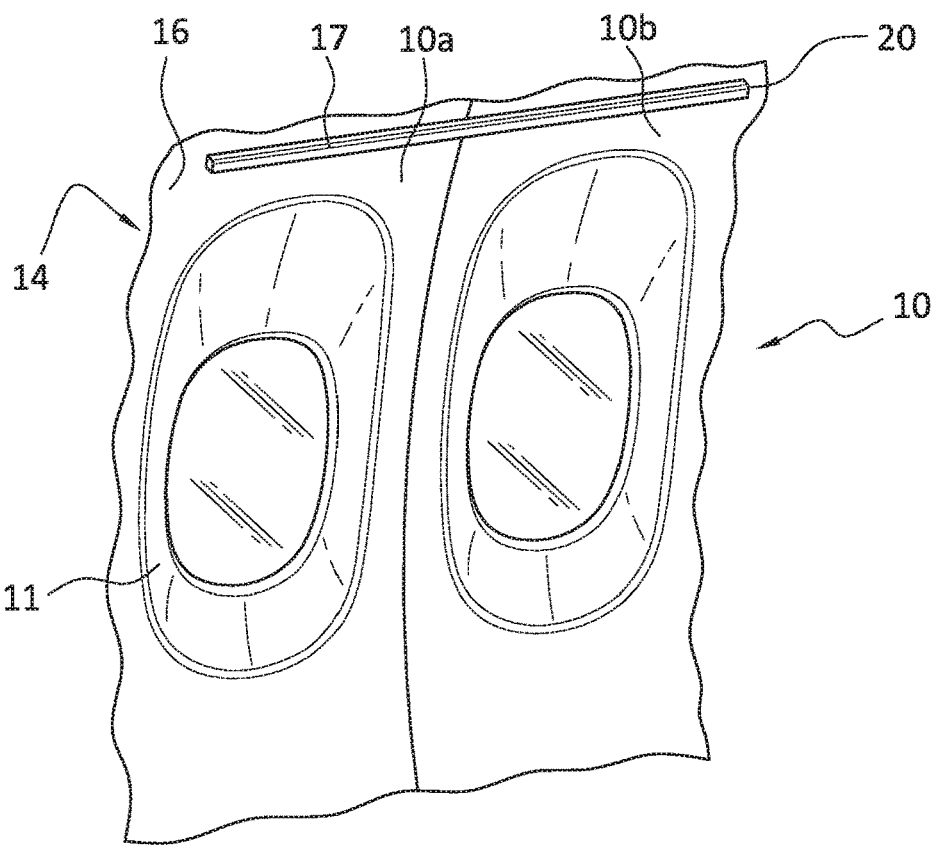
Figure 1B:
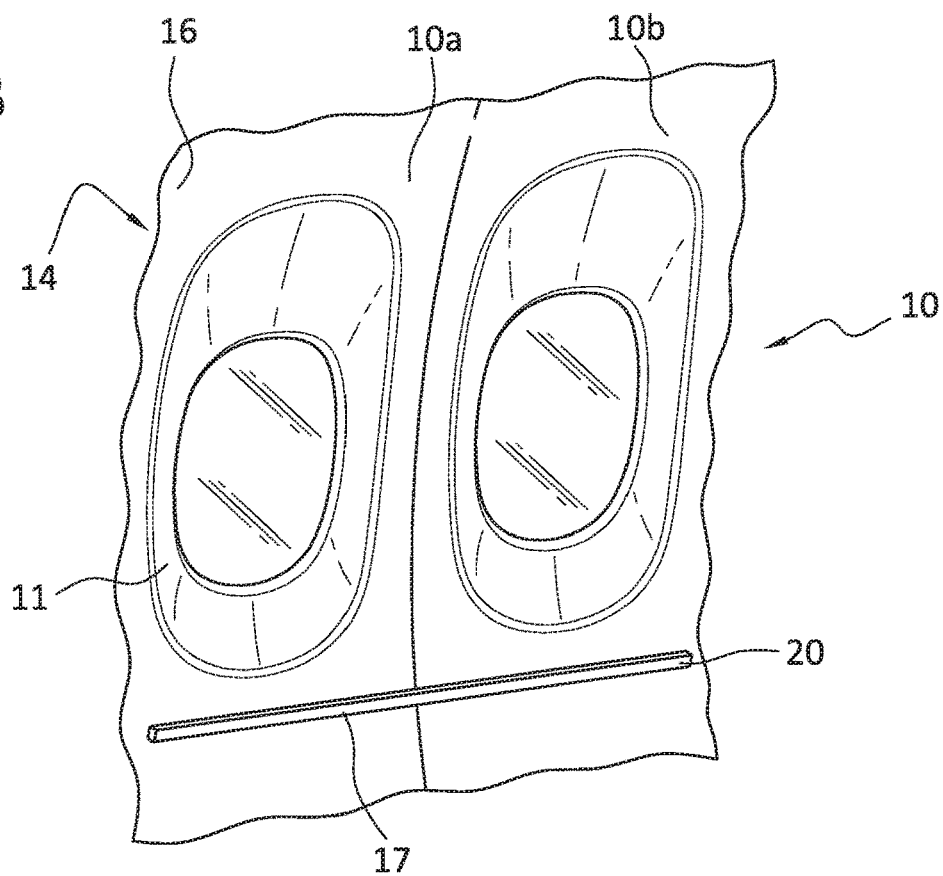
Figure 2:
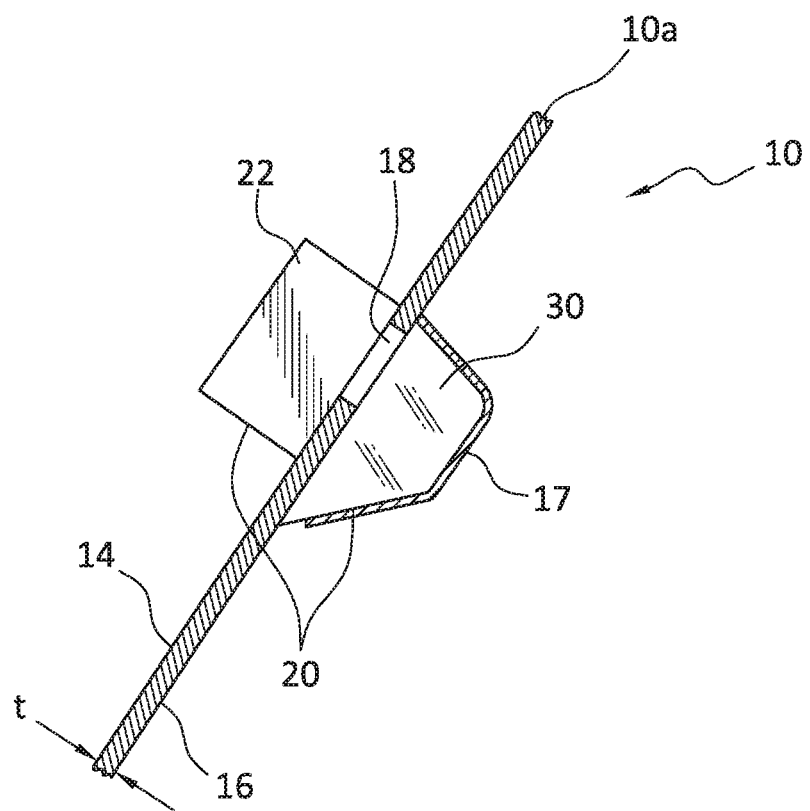
Figure 3:
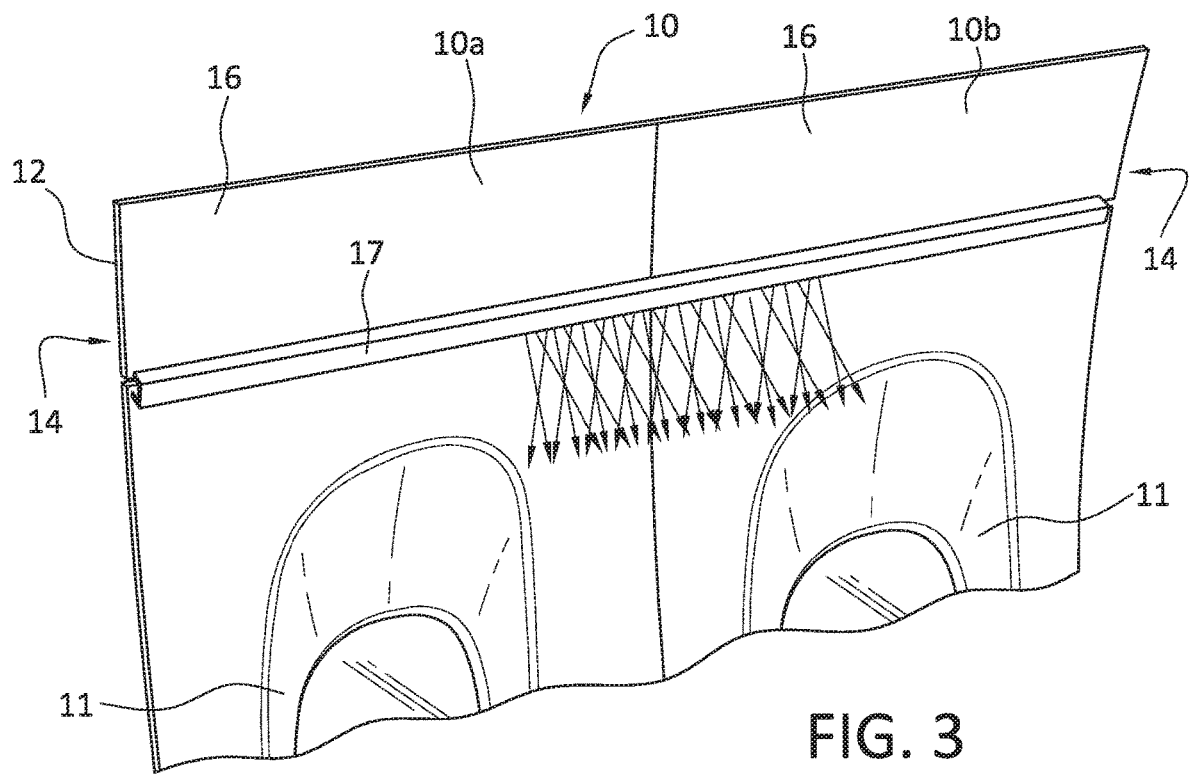
Figure 4:
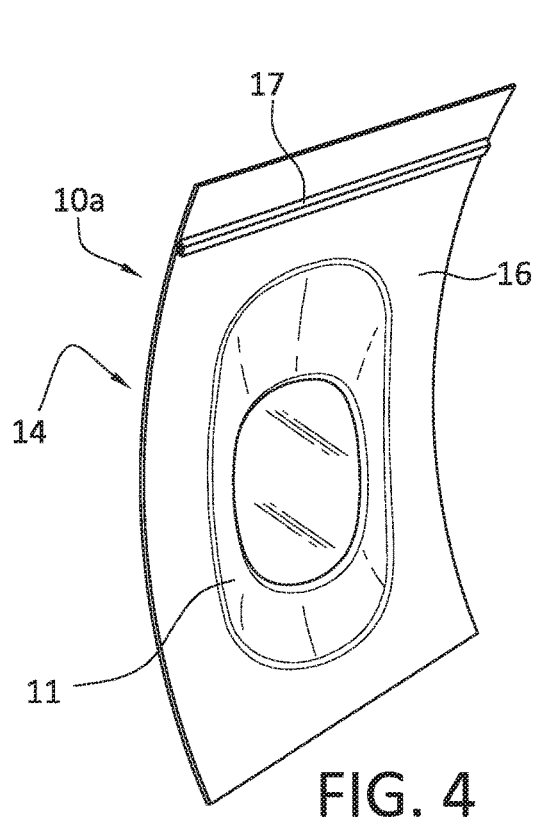
Figure 5:
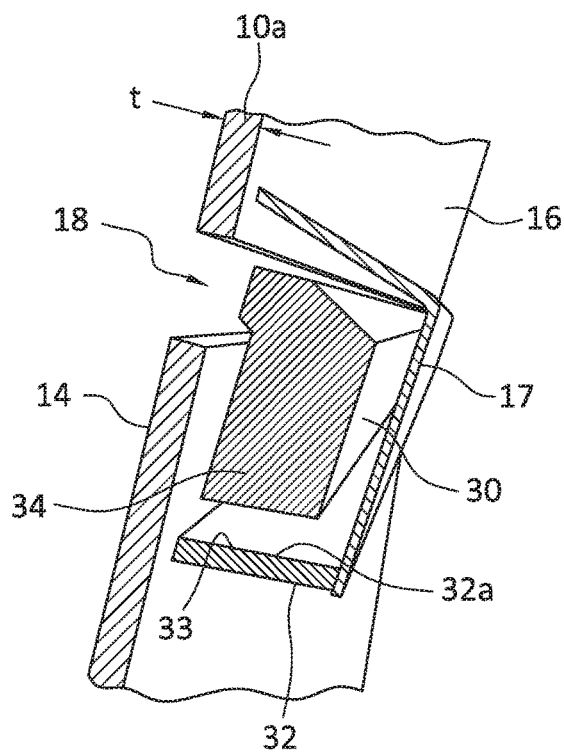
Figure 11A:
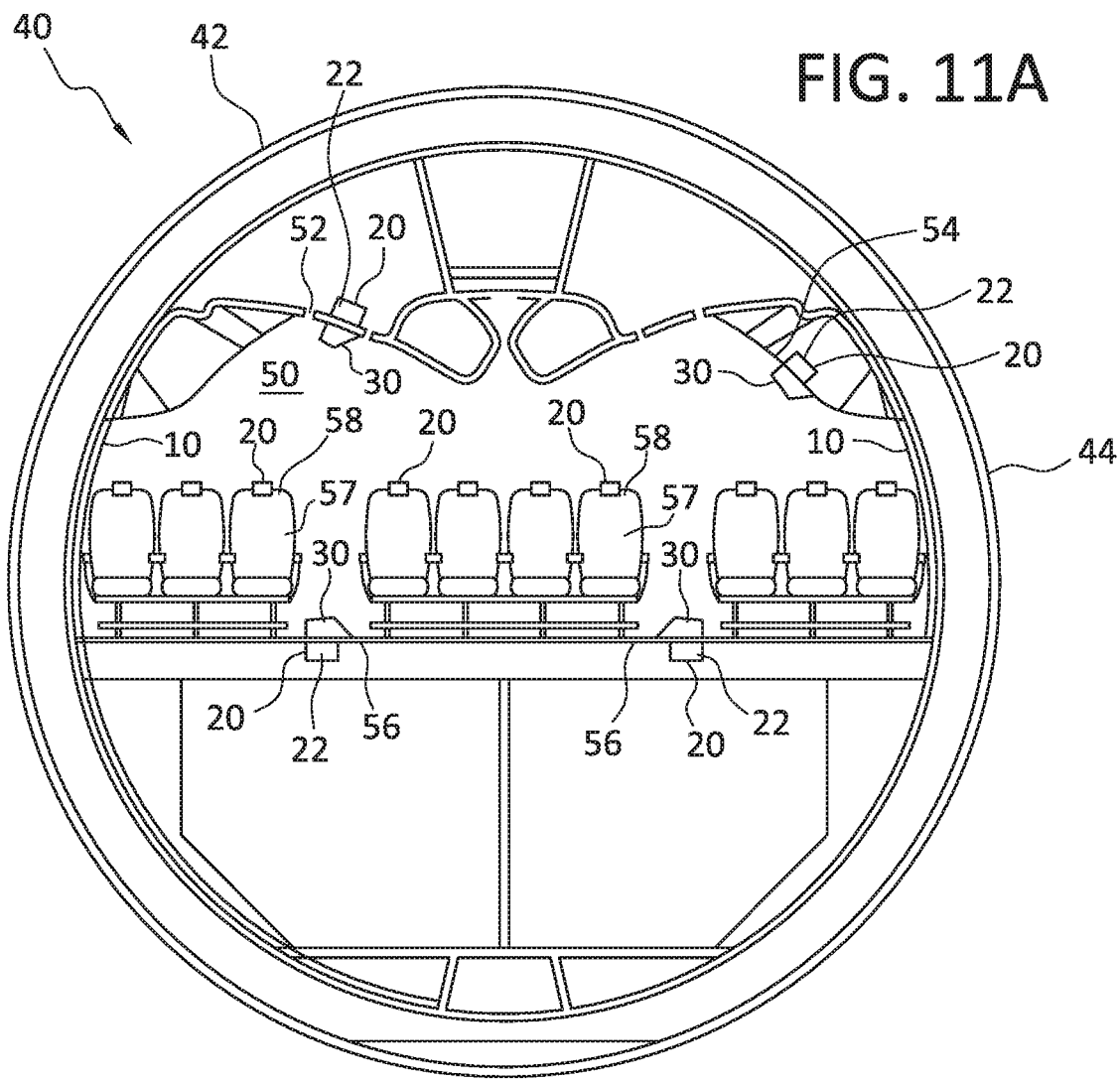
Figure 11B:
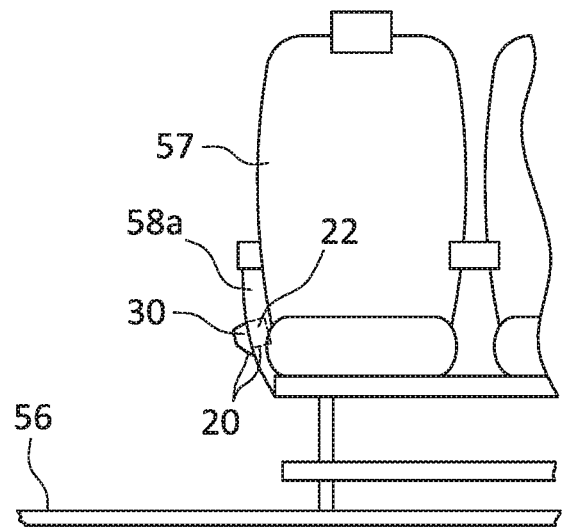
Figure 12:
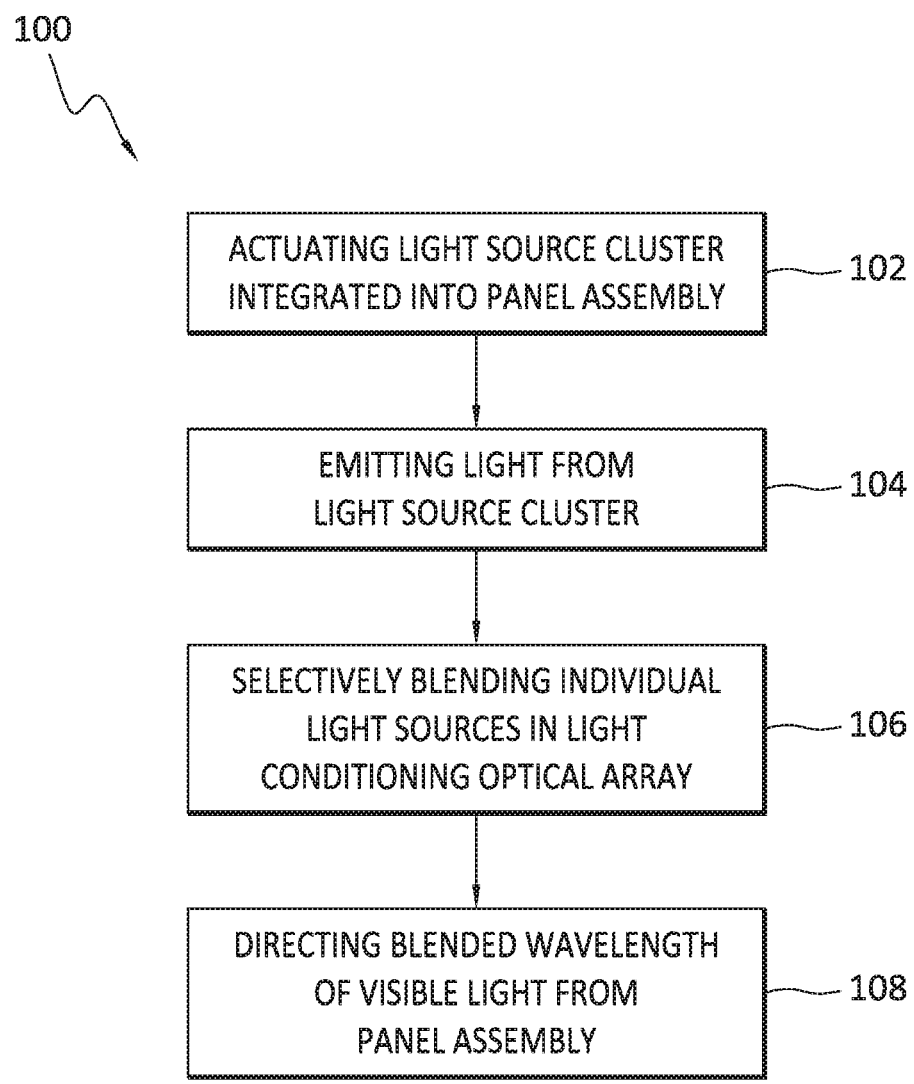
Figure 13:
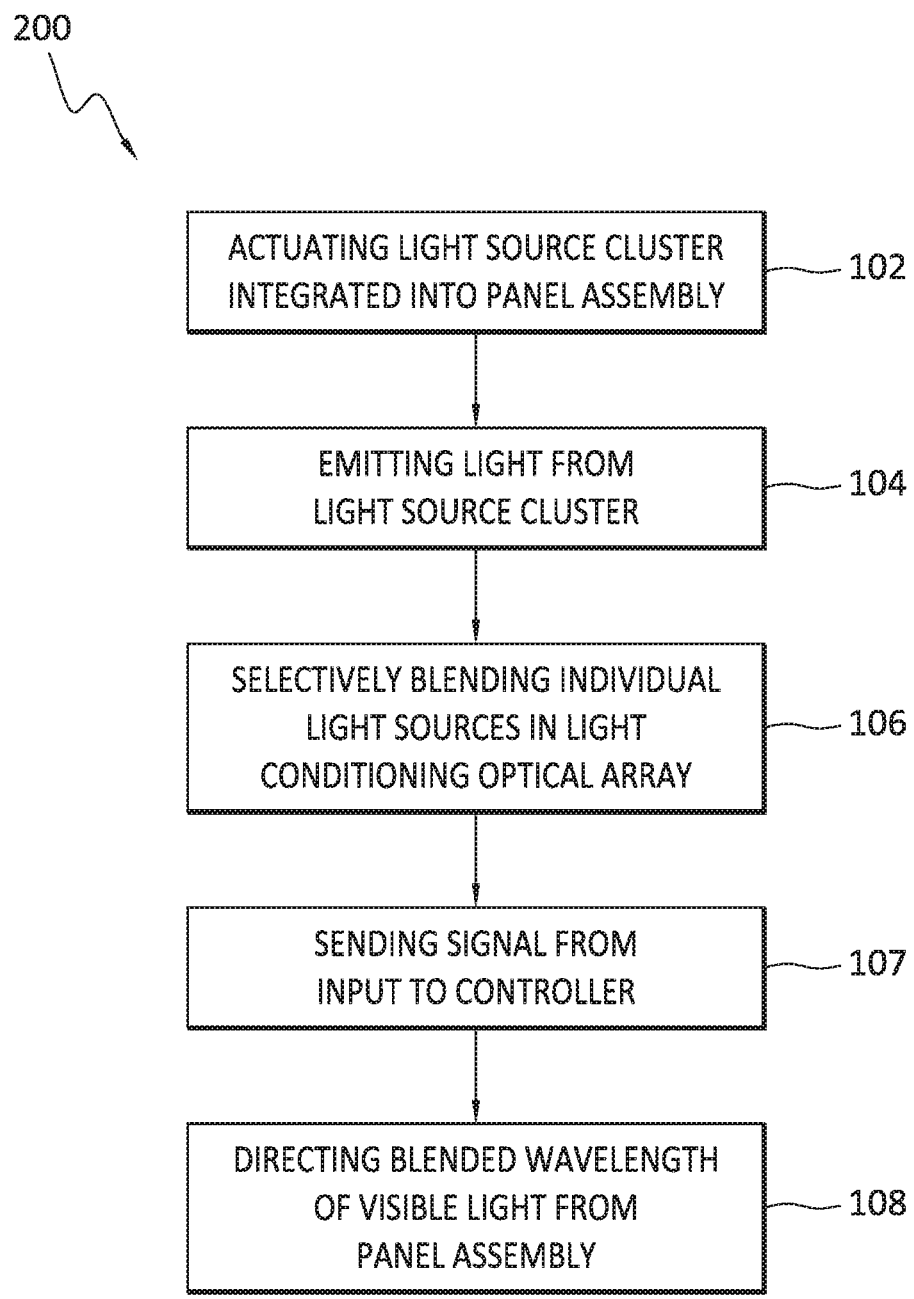

Having thus described variations of the disclosure in general terms, reference will now be made to the accompanying drawings, which are not necessarily drawn to scale, and wherein:

FIG. 1A is an illustration of a window assembly according to a present aspect;

FIG. 1B is an illustration of a window assembly according to a present aspect;

FIG. 2 is an illustration of a partial cross-sectional view of a light array incorporated into a sidewall panel of a window assembly according to present aspects;

FIG. 3 is an illustration of a partial view from a cabin interior toward a sidewall assembly according to present aspects;

FIG. 4 is an illustration of an aircraft incorporating a light assembly according to present aspects;

FIG. 5 is a partial cross-sectional enlarged view of a window sidewall assembly showing an enhanced partial cross-sectional view of a light guide in a lighting array according present aspects;

FIG. 6 is a cross-sectional view of a light guide according to present aspects;

FIG. 7A is a perspective view of a lighting array including a light guide integrated into the lighting array, according to present aspects;

FIG. 7B is a perspective view of a lighting array including a light guide integrated into the lighting array, according to present aspects;

FIG. 8 is a plan view of a light source cluster according to present aspects;

FIG. 9 is a cross-sectional view of a lighting array including a light guide including micro-optics according to present aspects;

FIG. 10 is an illustration of a vehicle in the form of an aircraft, according to present aspects;

FIG. 11A is a cross-sectional view of the vehicle shown in FIG. 10, and according to present aspects;

FIG. 11B is a cross-sectional and enlarged view of a seat as shown in FIG. 11A0, and according to present aspects;

FIG. 12 is a block diagram illustrating a method according to present aspects;

FIG. 13 is a flowchart outlining a method according to present aspects; and

Figure 14:
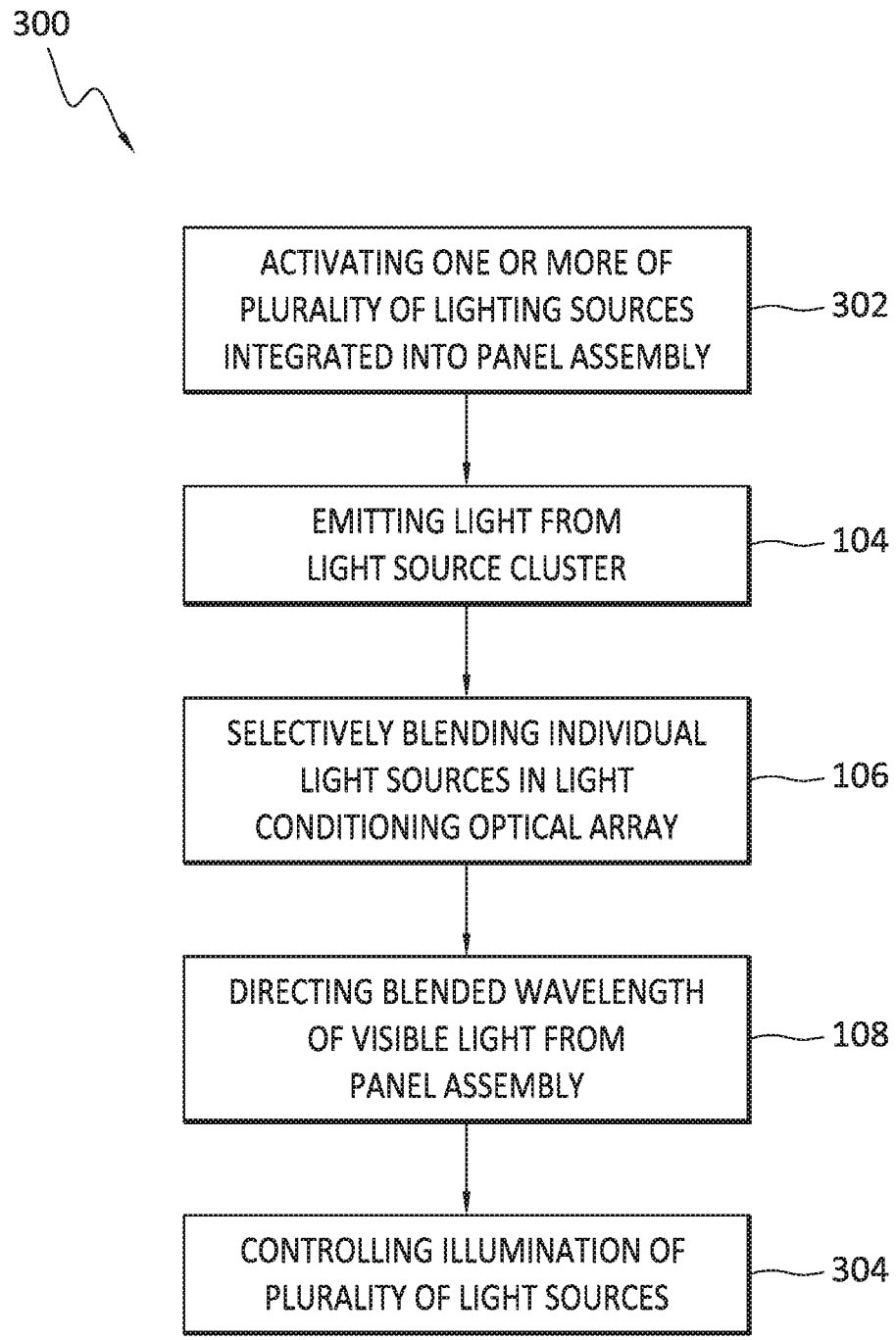

FIG. 14 is a flowchart outlining a method according to present aspects.

DETAILED DESCRIPTION

Presently disclosed methods, systems, and apparatuses include solutions to the problem of mixing, blending, and/or trimming light wavelengths to produce a substantially uniform lighting effect projected into an enclosed environment and onto surfaces contained within enclosed environments. According to further present aspects, lighting arrays are incorporated or otherwise integrated into existing structures such as, for example, panels and/or panel assemblies that can be ceiling panels, floor panels, sidewall panels, window panels, etc. (and or their associated panel assemblies, etc.). By incorporating presently disclosed lighting arrays into existing structures, present aspects contemplate molding into or otherwise modifying structures, that can be existing structures (e.g., panels and/or panel assemblies), for the purpose of incorporating lighting arrays into the existing structures, including such incorporation occurring largely within the physical footprint of the existing structure. According to present aspects, the incorporation of lighting arrays into existing structures facilitates installation, maintenance, replacement, etc., reducing the effort associated with installation, maintenance, rework, replacement, complexity, and the number of man hours typically associated with installation, maintenance, rework, replacement, etc. of lighting arrays, including lighting arrays installed into confined areas where space for such installations is restricted, or it is otherwise difficult to achieve lighting array installation due to confined spaces.

While present aspects disclose facilitating installation of lighting components into a confined space by integrating lighting arrays comprising, for example LED clusters into various substrates (e.g., cabin interior panels, etc.), further present aspects facilitate the wiring of lighting arrays. For example, while, for example, cabin interior panels previously included lighting assemblies where laborious light-to-light connections were established, present aspects reduce complexity and labor for lighting installation by incorporating integrated lighting assemblies into panels, and then electrically connecting leads on panels such that each panel and each lighting array incorporated into such panels can contain a plurality of, for example, LED clusters, without having to establish individual light-to-light connections.

By way of further example, typical panel lighting of, for example, cabin interior requires the addition of lighting components separately onto for example, a substrate panel. For example, a lighting bar with linear lighting fixtures may be fastened or otherwise attached to a typical panel, with additional and separately installed lighting components (e.g., lenses, diffusers, etc.) added through additional manufacturing steps. In the case of an extended cabin interior such as, for example, an aircraft cabin, such linear components can be three feet or longer (with such separately added components typically requiring separate retainers or fasteners, etc.) making installation, rework, replacement, etc., of such separate lighting components an extensive and expensive process in terms of both materials and labor. In addition, where overall weight is a consideration (e.g., overall aircraft weight, etc.) such additional components that require additional fasteners, such assemblies can undesirably add to the weight of the assembly, can also add weight to the overall structure (e.g., add overall weight to the aircraft, etc.).

In contrast to the typical lighting arrays of several feet in length that have been fastened to panels, according to present aspects, lighting arrays are integrated into panels before the installation of such panels into larger structures and assemblies such that lighting arrays of up to about 6 inches are so integrated into panels, preferably prior to the installation of such panels into larger structures and/or assemblies. The use of shorter lighting arrays that are preferably arranged in lighting clusters (and that can be integrated into panels in lighting units of up to six inches, for example) modularizes the integrated lighting arrays in a way that increases the versatility of achievable lighting effects and further serves to increase lighting uniformity across an area or across areas of, for example, a cabin interior. According to further aspects, the integrated lighting arrays can provide a lighting source in the form of, for example, an LED lighting array cluster or a plurality of lighting clusters, such that the lighting clusters are presented to and otherwise integrated into a panel at an orientation of about at least one lighting array cluster per inch of panel distance (e.g., panel length).

According to present aspects, light guides associate with, and can be oriented and configured to be in communication with one or more light source clusters to collimate, condition and otherwise blend or mix differing light wavelengths from individual LEDs that can be included in, and that can be positioned within, a light source cluster. The differing light wavelengths from individual LEDs that are within the LED clusters are then blended, conditioned, etc. for the purpose of forming a predetermined and substantially uniform light wavelength that emanates from the light guide and the lighting assembly. That is, according to present aspects, the light emanating from the presently disclosed light arrays, and panels comprising the light arrays has been conditioned to have a substantially uniform wavelength and color that has, for example a significantly uniform appearance to the human eye when the emanated light is projected upon a target substrate surface or is released for the purpose of creating ambient lighting. According to further present aspects, light guides are oriented to be dedicated or "assigned" to "cover" a predetermined number of light source clusters at least for the purpose of conditioning light wavelengths from individual light sources (of potentially varying wavelengths) within a light source cluster.

Such light guides can incorporate additional optics, micro-optics, reflective components, lenses, micro-lenses, etc. (collectively referred to equivalently herein as "mixing optics", "conditioning optics", "light conditioning optical arrays") to assist the lighting array in insuring that potentially varying light wavelengths are mixed to a degree that is sufficient to produce a predetermined wavelength that evidenced and otherwise perceived as a predetermined and substantially uniform "color" or "shade".

According to further present aspects, the control and processing of lighting signals, (e.g., lighting signals sent to the individual lighting arrays or lighting signals sent to a plurality of lighting arrays from one or more controllers and/or processors) further serves to increase the versatility of achievable lighting effects and serves to increase lighting uniformity across an area or across areas of, for example, a cabin interior. Such present signaling and control of the presently disclosed integrated lighting controls is in contrast with the signaling arrangements typically in communication with significantly longer (e.g., linear) lighting arrays, or lighting "bars" that are later fastened to a panel and that are known.

Further present aspects contemplate panels (e.g., panels that will incorporate the presently disclosed lighting arrays, lighting systems that include the lighting arrays and lighting assemblies that include the lighting arrays, etc.) that can be molded and/or extruded with the lighting assemblies molded into the panels during manufacture of the panels.

FIG. 1A is an illustration of a view from a cabin interior toward an area of a cabin interior that includes sidewall window assemblies in a cabin that can be an aircraft cabin. As shown in FIG. 1A, according to present aspects, panel assembly 10 includes a plurality of panels 10a, 10b, with window assembly 11 integrated into panels 10a, 10b. As shown in FIG. 1A, the panels 10a, 10b as shown, have a panel first side 14 (e.g., an exterior side not exposed to a cabin interior), and a panel second side 16 (e.g. an interior side that is exposed to a cabin interior). A light cover 17 is shown in FIG. 1A, with light cover 17 oriented adjacent to panel second side of panel 10a, 10b. In this configuration and according to this aspect, light emanating from light cover 17 can be directed in a downward direction from light cover 17, for example to illuminate sections of a sidewall panel located above window assembly 11 and beneath light cover 17.

FIG. 1B shows an alternative arrangement and aspect similar to the aspect shown in FIG. 1A, except that light cover 17 of the type shown in FIG. 1A is oriented adjacent to panel second side 16 of panels 10a, 10b and the light cover 17 is further shown as located beneath the window assembly 11. In this configuration and according to this aspect, light emanating from light cover 17 can be directed in an upward direction from light cover 17, for example, to illuminate or "uplight" sections of a panel located beneath window assembly 11 (e.g., a sidewall panel or sidewall panels) and above light cover 17. According to further aspects, though not explicitly shown, the panels, such as 10a and/or 10b (as shown in FIGS. 1A and 1B) can include light covers (that are associated with light arrays) located both above and below one or more window assembly 11 for the purpose of both directing light downward and/or directing light upward (shown in FIGS. 1A and 1B). In this alternative that is not explicitly shown, a user (e.g., a passenger) or a master control or programmable lighting effect sequence, for example, can simultaneously direct light from a light array located both above and below a window assembly, or can select whether or not light will emanate from a sidewall panel from either above or below the window assembly at a given moment in time, etc. and/or at a particular wavelength of light (e.g., emanate as a particular light color, etc.) As shown in FIGS. 1A and 1B, the panels 10a, 10b can be sidewall panels and the panel assembly 10 can be a sidewall panel assembly.

FIG. 2 is a partial cross-sectional view of the panel assembly 10 shown in FIG. 1A. As shown in FIG. 2, and as according to present aspects, the panel assembly 10 (that can be, for example, a panel assembly) has a light array 20 incorporated into the panel 10a (that can be, for example, a panel). The light array 20 includes a first enclosure 22 positioned adjacent to the panel first side 14, and a second enclosure 30 positioned adjacent to the panel second side 16. The panel 10a is shown with a through opening 18 extending from the panel first side 14 through the thickness of the panel 10a to the panel second side 16, such that the through opening 18 provides an open passageway, or otherwise provides access from the first enclosure 22 of light array 20 the second enclosure 30 of light array 20. Light cover 17 is shown in FIG. 2 as oriented adjacent to panel second side of panel 10a. Though not shown in FIG. 2, light cover 17, if desired, can extend through the thickness "t" of panel 10a, and light cover 17 further can attach to panel first side 14, can attach or otherwise be positioned adjacent to panel second side 16, or can attach or be positioned adjacent to both panel first side 14 and to panel second side 16.

FIG. 3 is a partial view from a cabin interior toward a panel assembly 10 in, for example, a cabin interior that can be, for example, an aircraft cabin, and as shown in FIG. 1A and/or FIG. 2. As shown in further detail in FIG. 3, arrows, representing light beams are shown emanating from beneath light cover 17 and radiating from the lighting array (not shown in FIG. 3) and out from the light cover 17, with the light beams directed against surfaces of the panel second side 16 of panels 10a, 10b. According to present aspects, the arrows representing light beams include light beams have a predetermined blended wavelength found within the visible light spectrum, with such beams originating from individual light sources located in light source clusters (not shown in FIG. 3) and then directed from the light source clusters that are oriented within the first enclosure 22 of light array 20, and then directed to a light guide 34 as shown in FIG. 5. According to one aspect, the light beams are directed from the first enclosure 22, through the through opening 18 in the panels 10a and 10b and into the second enclosure 30 containing light guide 34 (shown in FIG. 5), where the beams are combined, blended, etc. and the light beams from the light sources are otherwise conditioned to form a blended light wavelength having a predetermined wavelength in the visible light spectrum that is perceived by, for example, a human eye as having a predetermined color or "hue".

FIG. 4 shows a further view of the panel 10a as shown in FIGS. 1A, 2, and 3, with the enumerated parts numbered similarly. As shown in FIG. 4, light cover 17 extends laterally across a lateral length of panel 10a. According to present aspects, light cover 17 can be configured to extend across the lateral length of one panel as shown in FIG. 4, or the light cover 17 can be configured to extend across the lateral length of more than one sidewall panel as shown in FIGS. 1A, 1B, and 3 (where light cover 17 extends across the lateral lengths of both of panel 10a and panel 10b).

According to further aspects, a light conditioning array that contributes to the light conditioning of the light emitted from the LED clusters includes as least one light guide that can be oriented on a panel first side, a panel second side, or that can extend from a panel first side into a panel second side, etc. According to present aspects, light guides (equivalently and interchangeably referred to herein as light tubes, light pipes, light homogenizers, etc.) are physical structures that can be used for transmitting and distributing natural or artificial light for the purpose of enhancing, attenuating, and otherwise conditioning light received into the light guide. According to present aspects, useful light guides that can be employed in the present light arrays include highly polished interior surfaces or interior linings that lead or otherwise direct light through the light guide (that can be in the form of a light tube or light pipe, etc.), from the point of light entry to the point of light exit from the light guide. The entrance point of the light guide can include a dome feature that collects and reflects into the light guide as much light provided to the light guide as possible. The light guide can further include optical components including reflectors, collectors, etc., including Fresnel lens devices that assist in the collection and direction of the light through the light guide.

According to present aspects, the direction of the light emanating from the light clusters is directed to change direction one or more times to a predetermined and desired exit point that includes directing the light through and from the light array and toward a panel surface, preferably of a cabin interior (e.g., a sidewall, panel, a ceiling panel, a floor panel, a seat panel, etc.). The change of direction of the light passing through the light array can be accomplished by an angular light guide with a highly reflective interior surface (e.g., greater than about 99.5 percent), or by a combination of a substantially linear light guide with a series of directional optical components (referred to equivalently herein as "light directing optical components") responsible for changing the direction of the light passing through the light arrays such that the light exits the light guide in a direction that is different from the direction of the light emanating from the light sources and the light source clusters. Additionally, substantially linear light guides are understood to include highly reflective interior surfaces, and that can have a degree of reflectivity that can be less than 99.5% reflectivity.

According to present aspects, a light guide can be housed at least in the first enclosure of light array with light emanating from the light guide directed through the through opening in a panel and into the second enclosure of the light array, with the second enclosure housing a plurality of direction optical components that then direct the light conditioned by the light guide out from the second enclosure (e.g., from an opening the second enclosure). According to further aspects, the light directed out from the second enclosure is directed to engage or otherwise impact a proximate surface, including, for example, a panel that can be e.g., a sidewall panel, a ceiling panel, a floor panel, a storage bin panel, a seat panel, etc.

FIG. 5 is a partial cross-sectional enlarged view of the window sidewall assembly 10a shown in FIGS. 1A, 2, 3, and 4, showing an enhanced view of a light guide 34 contained within or otherwise oriented with the second enclosure 30 (shown in FIG. 2) that comprises a portion of light array 20 (as shown, for example, in FIG. 2). FIG. 5 also shows a lens 32 oriented proximate to and at a predetermined distance from the light guide. Lens 32 has a lens upper surface 32a that can incorporate micro-optics 33 on top of the lens 32.

FIG. 6 is a cross-sectional view of the light guide 34 shown in FIG. 5. As shown in FIG. 6, light guide 34 includes a plurality of reflective surfaces 34a, and an optionally diffuse surface 34b and optional micro-optics 33a oriented on internal surfaces of light guide 34.

FIG. 7A is a partially exposed view of the light guide 34 shown in a preferred orientation within and adjacent to the light cover 17. As shown in FIG. 7A, light guide 34 is shown including a plurality of light sources 25 that can be integrated LEDs, with the light sources 25 shown as individual light sources in a linear array. As light from the light sources 25 is directed into light guide 34, the light from light sources 25 is directed into the light guide 34 where the light from the light sources is "blended", such that varying light wavelengths from the light sources are blended (assuming that individual light source comprise light sources that emit different or varying light wavelengths—e.g., varying "colors" of light).

According to further present aspects, signals from a processor or controller can be sent to the light sources with the light sources then configured to emit light at a predetermined wavelength and at a predetermined intensity. As the light from the light sources is blended in the light guide, a predetermined light color can be crafted or formed with the predetermined light color in the form of a predetermined light wavelength that is then directed out from the light guide to "light" or otherwise illuminate an area associated with, for example, a cabin interior that includes a cabin interior panel into which the light guide and light sources are integrated.

FIG. 7B is a partially exposed view of the light guide 34 shown in a preferred orientation within and adjacent to the light cover 17. As shown in FIG. 7B, light guide 34 is shown including a plurality of integrated light source clusters 24 that can be of the type illustrated in FIG. 8. FIG. 8 shows an arrangement of individual light sources 25 (e.g., LEDs) arranged or grouped into a light source "cluster" 24 (e.g., a light emitting diode cluster, and also shown in FIG. 7B) as being four light sources 35 (e.g., four LEDs) arranged into such a light source cluster, although any number of, 2, 3, 4, 5, 6, 7, 8, or more of light sources 25 can be integrated into a single light source cluster 24. As light from the light source clusters 24 (and from the individual light sources 25 in the light source cluster 24) is directed into light guide 34, the light from light source clusters 24 is "blended" such that varying light wavelengths from the light sources (assuming that the light sources emit varying light wavelengths—e.g., varying "colors") is combined to a predetermined wavelength for the purpose of forming a predetermined color of light emitted from the light array.

According to further present aspects, signals from a processor or controller can be sent to the light sources with the light sources then configured to emit light at a predetermined wavelength and at a predetermined intensity. As the light from the light sources is blended in the light guide, a predetermined light color can be crafted or formed with the predetermined light color in the form of a predetermined light wavelength that is then directed out from the light guide to "light" or otherwise illuminate an area associated with, for example, a cabin interior that includes a cabin interior panel into which the light guide and light sources are integrated.

FIG. 9, according to further present aspects, shows an enlarged partial cross-sectional view of a panel with an integrated light array as shown, for example, in FIG. 2. As shown in FIG. 9, first enclosure 22 of light array 20 includes and houses a plurality of light clusters 24, each of which can include a grouping of individual light sources 25 (shown in FIGS. 7B and 8). First enclosure 22 further includes a light guide optical integrator 23 that mixes, blends, trims, and/or otherwise conditions the light emitted from the light clusters 24. Light guide optical integrator 23 is shown in FIG. 9 as directing the light from the first enclosure 22 through the through opening 18 in the panels 10a, 10b and into the light guide 34 with the light guide oriented within the second enclosure 30.

FIG. 10 is an illustration of a vehicle 40 in the form of an aircraft including a fuselage section 42 further including a plurality of windows 44. According to present aspects, the panel assemblies 10 shown in FIGS. 1A, 1B, 2, 3, 4, 5, 6, 7A, 7B, 8, 9, 11A, and/or 11B, can incorporate at least a portion of the interior of the windows 44 and/or window assemblies 11 in vehicle 40. While the vehicle 40 shown in FIG. 10 is an aircraft, according to present aspects, the panel assemblies incorporating the window assemblies and lighting assemblies also can be incorporated in other vehicle types including, for example, terrestrial vehicles, surface and subsurface waterborne vehicles, spacecraft, rotorcraft, satellites, etc.

While FIGS. 1, 2, 3, 4, 5, 6, 7A, 7B, 8, and/or 9 show, in some detail, a lighting array integrated into a panel that can be a sidewall panel, present aspects contemplate the incorporation of the present integrated lighting arrays integrated in panels other than sidewall panels, and including, for example, incorporation into ceiling panels, floor panels, storage bin panels, etc. For example, FIG. 11A is a cross-sectional view of fuselage section 42 of vehicle 40 in the form of an aircraft taken along line B-B. As shown in FIG. 11A, cabin 50 includes ceiling panels 52, storage bin panels 54, floor panels 56, and seat panels 58 (associated at multiple locations of seat 57; shown in FIG. 11A as a seat panel in the vicinity of or otherwise incorporated into a head rest in seat 57, and shown in FIG. 11B in the vicinity of or otherwise incorporated into an arm rest in seat 57). Also shown in FIG. 11A are panel assemblies 10 of the type shown in FIGS. 1, 2, 3, 4, 5, 6, 7A, 7B, 8, and/or 9 located in the cabin interior, and that can be oriented adjacent to windows 44. According to further aspects, FIG. 11A shows lighting arrays 20 positioned adjacent to ceiling panels 52, storage bin panels 54, floor panels 56 and seat panels 58. As shown with respect to the light array 20 incorporated or integrated into the storage bin panel 54, the light array 20 includes the first enclosure 22 and second enclosure 30. The light arrays positioned throughout the cabin and incorporated into ceiling panels, floor panels and seat panels are understood as also comprising the first enclosure 22 and second enclosure 30 components of light array 20.

According to another aspect, FIG. 11B is an enlarged view of a seat 57, that can be of a seat of the type shown in FIG. 11A. As shown in FIG. 11B, and according to another aspect, lighting array 20 can positioned adjacent to a seat panel 58a of, for example (and as shown in FIG. 11B) an aisle seat. In this alternative aspect, the light array 20 can direct light from the light array 20 in the form of an accent light, or in the form of an emergency light to assist passengers in "way finding" in, for example, situations of subdued lighting, in an emergency, etc.), or to otherwise indicate a pathway for passenger movement, or to otherwise indicate and offer additional lighting to assist in ingress or egress to or from a seating location.

As shown at least in FIGS. 11A and 11B, and according to present aspects, the blended light formed by presently disclosed methods, systems, and apparatuses, can be emitted from lighting arrays 20 and directed to and/or projected onto a target surface (e.g., a panel, including a cabin interior panel further including ceiling panels, floor panels, sidewall panels, storage bin panels, etc.) in any predetermined direction. In other words, the light can be directed from the light array in an upward, downward, or other direction, at a substantially uniform blended wavelength toward a target surface such that the lighting effect as perceived by the human eye appears to have a substantially uniform color and/or substantially uniform intensity that can be, for example, a predetermined color and/or intensity. For purposes of this disclosure, the terms "blending", "mixing", "combining", "trimming", "conditioning" are used equivalently herein, at least with respect to the mixing/blending/combining/trimming/conditioning of light wavelengths within the presently disclosed light guides, lighting arrays. and the panels integrating presently disclosed light guides, lighting arrays, etc.

According to present aspects, the light clusters, can be light emitting diode (LED) clusters. According to one aspect, the LED clusters can each include, for example, red, blue, green and white light emitting diodes that are preferably oriented in a non-linear orientation with respect to one another and in a grouping or "cluster", and as shown, for example, in FIG. 8. When lighting of a predetermined color and/or lighting intensity is desired, for example to produce a predetermined and desired ambiance or other effect, etc., the colors afforded by lighting sources emitting wavelengths associated with a predetermined wavelength, wavelengths, or wavelength ranges can be produced by combining light emitted from individual light sources to produce or form a predetermined blended light wavelength that produces a predetermined visible color within the visible light spectrum. The predetermined color so formed, then produces a predetermined lighting effect (e.g., in an environment that can include a substrate such as, for example, a target panel, etc.) that displays a desirable and predetermined substantial uniformity (and/or a desired and predetermined intensity) and that does not produce alternating dim and bright regions (e.g., a scalloping effect on a target surface).

As shown in the FIGS., the present light arrays can be incorporated into assemblies and/or sub-assemblies (e.g., interior cabins, etc.) of larger objects including, for example and without limitation, a sidewall panel and/or sidewall panel assembly, a ceiling panel and/or a ceiling panel assembly, a flooring panel and/or a flooring panel assembly, a seat panel and/or a seat panel assembly, etc., including sub-assemblies joined to, or otherwise in communication with such listed or other cabin interior assemblies, also including, for example and without limitation, closets, storage bins, etc. According to further aspects, the cabins having cabin interiors can be included in objects such as vehicles, including, without limitation, an aircraft, a spacecraft, a rotorcraft, a terrestrial vehicle, a surface water borne vehicle, a sub-surface waterborne vehicle, and combinations thereof. Objects incorporating the light arrays according to present aspects can be included in fixed objects such as, for example, panels or walls in buildings, etc.

FIG. 12 is a flowchart outlining a method 100 according to present aspects, including actuating 102 a light source clusters or a plurality of light source clusters integrated into a panel or a panel assembly. The method 100 further includes emitting 104 light from the light source cluster and selectively blending 106 individual light sources integrated into the light source cluster in a light conditioning optical array, for example, including treatment of the light source from the light source clusters in a light guide, and directing 108 a blended wavelength of visible light out from the panel or panel assembly (e.g., using a directional optics array including, for example, mirrors, lenses, etc.). The light comprising blended wavelengths of visible light that is directed out of the panel assembly can be directed to a substrate surface, such as a panel of a cabin interior that can be, for example, a sidewall panel (e.g., a sidewall panel of a window assembly, etc.), a ceiling panel, a floor panel, a seat panel, etc. For the purposes of the present disclosure, the terms "directing", "delivering", "controlling", "distributing" are equivalent terms, used equivalently herein, at least with respect to the operation of emitting and transmitting light from a source to a target substrate (e.g., a panel surface, including an cabin interior panel surface, etc.).

FIG. 13 is flowchart outlining a method 200 according to present aspects, including actuating 102 at least one light source cluster integrated into a panel or a panel assembly. The method 100 further includes emitting 104 light from the light source cluster and selectively blending 106 individual light wavelengths emitted from individual light sources integrated into the light source cluster in a light conditioning optical array, for example, including treatment of the light wavelengths emitted from the individual light sources within the light source cluster in a light guide. The method 200 further includes sending 107 a signal from an input to a controller, with the controller being in communication with at least one of the light source clusters, the light guide, or other conditioning or directional optics in the light array assembly, and directing 108 a substantially uniform blended wavelength of visible light out from the panel or panel assembly (e.g., using a directional optics array including, for example, mirrors, lenses, etc.). The light comprising blended wavelengths of visible light that is directed out of the panel assembly can be directed to a substrate surface, such as a panel of a cabin interior that can be, for example, a sidewall panel (e.g., a sidewall panel of a window assembly, etc.), a ceiling panel, a floor panel, a seat panel, etc.

FIG. 14 is flowchart outlining a method 300 according to present aspects, including actuating 102 at least one of a plurality of light source clusters integrated into a panel or panel assembly. The method 100 further includes emitting 104 light from the light source clusters that incorporate individual light sources, and selectively blending 106 wavelengths of light emitted from individual light sources from the light source cluster in a light conditioning optical array, for example, including treatment of the light source from the light source clusters in a light guide, and directing 108 blended wavelengths of visible light out from a lighting array that is incorporated into a panel or a panel assembly (e.g., using a direction optics array including, for example, mirrors, lenses, etc.). Method 300 further includes controlling illumination of or from the plurality of light source clusters, for example, by controlling the wavelengths of visible light emanating from the light source clusters and/or by signaling and otherwise controlling the light guide for the purpose of conditioning the visible light that emanates or is otherwise emitted from the light array, for example, in real time.

Though not shown in FIG. 14, the method 300 can further include sending 107 a signal from an input to a controller, with the controller being in communication with at least one of the light source clusters, the light guide, or other conditioning or directional optics in the light array assembly, and then directing 108 a substantially uniform blended wavelength of visible light out from the panel assembly (e.g., using a direction optics array including, for example, mirrors, lenses, etc.). The light comprising the substantially uniform blended wavelength of visible light that is directed out of the panel assembly can be directed to a substrate surface, such as a panel of a cabin interior that can be, for example, a sidewall panel (e.g., a sidewall panel of a window assembly, etc.), a ceiling panel, a floor panel, a seat panel, etc.

The present aspects may, of course, be carried out in other ways than those specifically set forth herein without departing from essential characteristics of the disclosure. The present aspects are to be considered in all respects as illustrative and not restrictive, and all changes coming within the meaning and equivalency range of the appended claims are intended to be embraced therein.

What is claimed is:
1. A window assembly comprising:
   a window panel having a window panel thickness (t), said window panel comprising:
      a window panel first side;
      a window panel second side;
      a through opening through the window panel thickness (t) of the window panel, said through opening extending from said window panel first side to said window panel second side, said window panel second side comprising a window panel second side surface;
   a light array, said light array configured to be integrated into the window panel, said light array comprising:
      a first enclosure configured to enclose the light array, said first enclosure oriented on the window panel first side, said first enclosure comprising:
 at least one light source cluster, said light source cluster in communication with an electrical source;
 a light conditioning optical array configured to blend light emitted from the light source cluster, said light conditioning optical array in communication with the light source cluster;
a second enclosure oriented on the window panel second side, said second enclosure comprising:
 a lens configured to receive light emitted from the light conditioning optical array, said lens further configured to re-direct light received from the light conditioning optical array out from the second enclosure;
wherein the light array is integrated into the window panel before the light array is assembled into a window assembly; and
wherein the light array is configured to direct light from the second enclosure to the window panel second side surface to primarily illuminate at least a portion of the window panel second side surface.

2. The window assembly of claim 1, wherein the first enclosure houses a light emitting diode cluster.

3. The window assembly of claim 1, wherein the light conditioning optical array comprises at least one light guide.

4. The window assembly of claim 1, wherein the light conditioning optical array comprises a plurality of optical components, said optical components comprising at least one of: a mirror, a collimator, a lens, or combinations thereof.

5. The window assembly of claim 1, wherein light source cluster comprising a plurality of individual light sources, said individual light sources emitting different wavelengths of visible light.

6. A vehicle comprising the window assembly of claim 1.

7. The vehicle of claim 6, wherein the vehicle comprises at least one of:
 an aircraft; a spacecraft; a rotorcraft; a terrestrial vehicle; a surface water borne vehicle; a sub-surface waterborne vehicle, or combinations thereof.

8. A cabin comprising:
a window panel, said window panel having a window panel thickness (t), said window panel comprising:
 a window panel first side;
 a window panel second side;
 a through opening through the window panel thickness (t), said through opening extending from said window panel first side to said window panel second side;
a light array, said light array configured to be integrated into the window panel, said light array comprising:
 a first enclosure configured to enclose the light array, said first enclosure oriented on the window panel first side, said first enclosure comprising:
 at least one light source cluster, said light source cluster in communication with an electrical source;
 a light conditioning optical array configured to blend light emitted from the light source cluster, said light conditioning optical array in communication with the light source cluster;
 a second enclosure oriented on the window panel second side, said second enclosure comprising:
 a lens configured to receive light emitted from the light conditioning optical array, said lens further configured to re-direct light received from the light conditioning optical array out from the second enclosure;
wherein the light array is integrated into the window panel before the window panel is assembled into a window assembly; and
wherein the light array is configured to direct light from the second enclosure to the window panel second side surface to primarily illuminate at least a portion of the window panel second side surface.

9. The cabin of claim 8 wherein the first enclosure houses a light emitting diode cluster.

10. The cabin of claim 8, wherein the light conditioning optical array comprises at least one light guide.

11. The cabin of claim 8, wherein the light array comprises optical components, said optical components comprising at least one of a mirror, a collimator, a lens, or combinations thereof.

12. The cabin of claim 8, wherein light source cluster comprising a plurality of individual light sources, said individual light sources emitting different wavelengths of visible light.

13. A vehicle comprising the cabin of claim 8.

14. The vehicle of claim 13 wherein the vehicle comprises at least one of:
 an aircraft; a spacecraft; a rotorcraft; a terrestrial vehicle; a surface water borne vehicle; a sub-surface waterborne vehicle, or combinations thereof.

15. A method for illuminating a window assembly interior surface, the method comprising:
 activating a lighting source, said lighting source configured to be integrated into a window panel assembly, said window panel comprising a window assembly interior surface, said window panel assembly further comprising:
 a window panel having a window panel thickness (t), said window panel comprising:
 a window panel first side;
 a window panel second side;
 a through opening through the window panel thickness (t), said through opening extending from said panel first side to said window panel second side;
 a light array, said light array configured to be integrated into the window panel, said light array comprising:
 a first enclosure oriented on the window panel first side, said first enclosure comprising:
 at least one light source cluster positioned in the first enclosure, said light source cluster comprising a plurality of individual light sources, said individual light sources emitting different wavelengths of visible light, said light source cluster in communication with an electrical source;
 a light conditioning optical array configured to blend light emitted from the light source cluster, said light conditioning optical array in communication with the light source cluster;
 a second enclosure oriented on the window panel second side, said second enclosure comprising:
 a directional optical array configured to receive emitted light from the light conditioning optical array and re-direct emitted light received from the light conditioning optical array out of the second enclosure and into an environment;
 emitting light from the light source cluster;

selectively blending the individual light sources in the light conditioning optical array to obtain a predetermined blended wavelength of visible light; and directing the predetermined blended wavelength of visible light from the light array to the window assembly interior surface; and substantially uniformly illuminating the window assembly interior surface.

16. The method of claim 15, wherein, in the step of selectively blending the individual light sources, further comprising:

sending a signal from an input to a controller, said controller configured to be in communication with the light conditioning optical array.

17. The method of claim 15, further comprising:

activating one or more of the plurality of individual light sources; and controlling illumination of the plurality of individual light sources.

18. The method of claim 15, wherein the light conditioning optical array comprises a light guide.

19. The method of claim 15, wherein the light source cluster comprises a plurality of light emitting diodes.

20. The method of claim 15, wherein the window assembly interior surface comprises a vehicle window assembly interior surface.

21. The window assembly of claim 1, wherein at least a portion of the window panel second side surface is substantially uniformly illuminated.

22. The cabin of claim 8, wherein at least a portion of the window panel second side surface is substantially uniformly illuminated.

23. The method of claim 15, wherein at least a portion of the window assembly interior surface is substantially uniformly illuminated.

* * * * *